(12) United States Patent
Cai

(10) Patent No.: US 7,292,555 B2
(45) Date of Patent: Nov. 6, 2007

(54) APPARATUS AND METHOD FOR ENHANCING CHANNEL UTILIZATION RATIO IN A CDMA

(75) Inventor: Jianyong Cai, Shen Zhen (CN)

(73) Assignee: Huawei Technologies Co., Ltd., Shen Zhen (CN)

( * ) Notice: Subject to any disclaimer, the term of this patent is extended or adjusted under 35 U.S.C. 154(b) by 885 days.

(21) Appl. No.: 10/435,918

(22) Filed: May 12, 2003

(65) Prior Publication Data

US 2003/0235178 A1    Dec. 25, 2003

Related U.S. Application Data

(63) Continuation of application No. PCT/CN01/00692, filed on May 8, 2001.

(30) Foreign Application Priority Data

Nov. 21, 2000    (CN) .................................. 00 1 27466

(51) Int. Cl.
*H04B 7/216* (2006.01)
*H04Q 7/20* (2006.01)

(52) U.S. Cl. ...................... 370/335; 370/342; 370/441; 370/468; 455/436; 455/450; 455/522

(58) Field of Classification Search ................ 370/335, 370/468, 236, 342, 389, 252, 344; 455/436, 455/442, 522, 450
See application file for complete search history.

(56) References Cited

U.S. PATENT DOCUMENTS

| 5,442,625 | A | * | 8/1995 | Gitlin et al. ................. 370/342 |
| 5,583,851 | A | * | 12/1996 | Kato et al. ................... 370/342 |
| 5,592,469 | A | * | 1/1997 | Szabo ......................... 370/342 |
| 5,703,908 | A | | 12/1997 | Mammone et al. |
| 6,072,787 | A | * | 6/2000 | Hamalainen et al. ........ 370/335 |
| 6,097,733 | A | | 8/2000 | Basu et al. |

(Continued)

FOREIGN PATENT DOCUMENTS

CN    1257397 A    6/2000

(Continued)

*Primary Examiner*—Chi Pham
*Assistant Examiner*—Melanie Jagannathan
(74) *Attorney, Agent, or Firm*—Dorsey & Whitney LLP

(57) ABSTRACT

An apparatus and method for enhancing channel utilization in a CDMA system are provided. The method includes the steps of receiving a service request for data transmission on a channel; transmitting a service feature by the CDMA system to a channel management module, whereby a channel multiplexing method and a channel bandwidth are selected by the channel management module based on the service feature; transmitting data, wherein when a data transmission rate changes to an extent that capacity of a currently configured channel cannot satisfy a requirement of the data transmission rate, the currently configured channel is re-assigned by the channel management module; accounting a variation of the data transmission rate by the service access module during the data transmission; modifying the service feature of the current service; and updating a corresponding record of the service feature in a system database, so that when a next service request of a same service type of the user is received, updated record of the service feature is used as a reference for configuring and assigning the channel. Accordingly, the channel utilization is enhanced, and the number of times for re-assigning a channel is significantly decreased.

12 Claims, 4 Drawing Sheets

U.S. PATENT DOCUMENTS 6,108,369 A * 8/2000 Ovesjo et al. ............... 375/146
6,137,789 A * 10/2000 Honkasalo .................. 370/342

FOREIGN PATENT DOCUMENTS

| EP | 0 711 044 A2 | 8/1996 |
| EP | 0912019 A2 | 4/1999 |
| EP | 1032168 A2 | 8/2000 |

* cited by examiner

APPARATUS AND METHOD FOR ENHANCING CHANNEL UTILIZATION RATIO IN A CDMA

CROSS-REFERENCE TO RELATED APPLICATION

This utility patent application is a continuation application and claims priority of the PCT International Patent Application, serial number PCT/CN01/00692, filed on May 8, 2001, which claims the priority of the Chinese patent application, serial number CN 00127466.X, filed on Nov. 21, 2000; subject matter of which are incorporated herewith by reference.

FIELD OF THE INVENTION

The present invention relates to a CDMA (Code Division Multiple Access) communication system, and more particularly, the present invention relates to an apparatus and method for enhancing channel utilization ratio in a CDMA communication system.

BACKGROUND OF THE INVENTION

Besides providing basic communication functions, a CDMA communication system provides new data application services, such as facsimiles, short message exchanges, Internet accessing, etc. The new data application may comprise wireless personal computers, mobile offices, electronic transfer accounts transmission, handset network browsing, email transmitting and receiving, and the like. The feature of these applications is the burst characteristic of services, that is, a large amount of data is transmitted in a short time period, and after that, only a few of the data or none of the data will be transmitted. For example, when a WWW page is clicked by a user to connect, a download request is transmitted, and one or more packet sequences are transmitted during a request procedure, and a large amount of data on a channel is required to be transmitted rapidly. When a document requested by the user has been downloaded, the document is read by the user for a certain time period, and less amount of the data is transmitted on the channel during this time period. For such type of services, if channels with certain bandwidth are assigned conventionally to such services, the requirement for rapidly transmitting the data cannot be satisfied during service bursts, and also channel resources are wasted when there are less data. An effective resolution is to multiplex channels based on features of services, and the complementary between a plurality of services is utilized to transmit a plurality of services on one channel. The current data rate of a channel is then monitored. If a current data rate of a channel is very large, and a channel bandwidth cannot satisfy the requirement for transmission, reassignment of the channel will be executed. When services are idle, a small bandwidth will be reassigned to the channel to enhance a utilization ratio of the channel.

A typical feature of a packet service procedure is shown in FIG. 1. A session procedure of a packet service is composed of several packet calls. Each packet call comprises a plurality of packet requests, and an arrival time exists between different packets. When a call of a packet arrives, arriving data is read by a user for a period of time (reading time), and a small amount of data exists on a channel during this time period. After completing the reading of the data, a packet call will again be issued. The procedure is cycled continuously in this manner until the end of the packet service.

CDMA is a spread spectrum communication technology. One of the advantages of CDMA is to support packet services having variable data transmission rates. In the case of CDMA, multiple access is implemented by assigning a pseudo random code, which has an excellent characteristic of self-correlation and weak correlation to each user. A pseudo random code is used to convert user's signals into wideband spread spectrum signals, and the wideband spread spectrum signals are converted by a receiver into the original wideband signals that use the same pseudo random code. In a CDMA system, orthogonal variable spread factor (OVSF) codes, which ensure the orthogonality between different physical channels, are used for a channel code, because their spread factors (SFs) are variable. Therefore, different spread factors can provide different data transmission rate. The smaller the SF, the larger the data transmission rate is provided. This characteristic of CDMA allows a CDMA system to rapidly satisfy a variety of or variations of data transmission rates by selecting different spread factor codes.

A code tree structure of an orthogonal variable spread factor (OVSF) is shown in FIG. 2. The spread spectrum factors of a CDMA system are implemented by code resource management. All of the spread spectrum factors exist in a code tree. A code near a root node corresponds to a higher data transmission rate. The sibling nodes of the tree, i.e., the codes having the same length in a spread spectrum factor, are orthogonal, and a parent code is not orthogonal with a child code. The codes that are assignable in a code tree should satisfy the following conditions:

1) no code has been assigned on a path from the code to the root node $C_{1,1}$ of the code tree;

2) no code has been assigned in a child tree having the code as the root node.

For a lower data transmission rate channel, assigning a small spread spectrum factor code will cause many large spread spectrum factor codes unable to be assigned, and the number of codes, which can be used by the other users, is restricted. Thus, when assigning the codes, the codes having a large spread spectrum factor are retained as much as possible to satisfy the channel data transmission rate so as to retain more resources for the CDMA system.

Also, channel utilization can be increased by a method of multiplexing a plurality of services by a CDMA system on a physical channel. As shown in FIG. 3, the multiplex occurs before or after encoding internally or externally, after multiplexing the services and encoding the channels, the multi-service data are mapped onto a physical channel. If the entire data transmission rate excesses an upper limit of the data transmission rate of a single code, several physical channels can be assigned. For packet data, such as WWW browsing, FTP loading, and the like, two methods are used by CDMA for data transmission. The first is short data package data transmission, i.e. short data packets are applied directly onto a randomly accessed burst channel. This method is also referred to as common channel packet data transmission, which is adaptively used for infrequent short data packets. For transmitting large and frequent data packets on dedicated channels, a dedicated channel with a suitable spread factor is selected by the CDMA system based on a data transmission rate and a size of packet data. When the packet data bursts occur, the channel with large capacity is selected for data transmitting. Thus, for small or infrequent data packets, channel capacity is decreased to adapt the variation of the data transmission rate.

When a service request reaches a CDMA system, if the service can be multiplexed on the original channel, the physical channels are re-configured by the CDMA system. If the service cannot be multiplexed successfully on the original channel, a code resource management module is requested by the CDMA system for code resources. If a code resource request fails, the service will be rejected.

When the services are assigned by the above CDMA system, it is necessary to multiplex many types of services to increase channel utilization. In one aspect, when assigning the channels and configurations, the specific features of different services are different, and the service features of the same service of different users are also different. In another aspect, when configuring the channels, if the service feature of a specific service cannot be understood, it will cause the configuration to be blindness, resulting in that the channel resources are wasted and/or re-configured frequently, thereby significantly affecting the performances of the CDMA system.

One of the objectives of the present invention is to provide a method for enhancing the channel utilization of a CDMA system. The method assigns a channel bandwidth and a multiplexing method to enhance the channel utilization and reduce the number of re-configurations based on service features of different services of different users.

SUMMARY OF THE INVENTION

In order to realize the above objectives, a method for enhancing channel utilization of a CDMA system, in accordance with the principles of the present invention, comprises the steps of: receiving a service request comprising information of a service type and user by a service access module of the CDMA system; retrieving a service feature of a current service of the user from a system database based on the information of the service type and user; transmitting the service feature by the CDMA system to a channel management module of the system; selecting a channel multiplexing method and a channel bandwidth by the channel management module based on the service feature; transmitting data, wherein during data transmission, when a data transmission rate changes to an extent that capacity of a currently configured service channel cannot satisfy a requirement of the data transmission rate, re-assigning the currently configured service channel by the channel management module; accounting continuously variation of the data transmission rate during the data transmission by the service access module; modifying a service feature of the current service based on statistics; updating corresponding service feature in the system database when completing the data transmission; and using updated system database as a reference of a next channel configuration and assignment.

In the above method for enhancing the channel utilization of the CDMA system, the service type may comprise packet services, voice services, and other non-constant rate services.

In the above method for enhancing the channel utilization of the CDMA system, the service feature may comprise a maximum rate of the service, a duration of the maximum rate of the service, occurrence probability of the maximum rate, an average rate of the service, a duration of the average rate of the service, occurrence probability of the average rate, a minimum rate of the service, a duration of the minimum rate of the service, and occurrence probability of the minimum rate.

In the above method for enhancing the channel utilization of the CDMA system, the service type may comprise distribution of rates of the services, distribution of duration of each of the rates, and tendency statistic of rate variations.

In the above method for enhancing the channel utilization of the CDMA system, an initial service feature of each service type of each user is determined based on a common model of the service type.

In the above method for enhancing the channel utilization of the CDMA system, the number of times for modifying the service feature of the current service can be a large number, and modification is implemented each time based on a modified service feature, or based on the initial service feature.

DETAILED DESCRIPTION OF THE PREFERRED EMBODIMENTS

The invention will further be described by incorporating the embodiment and the drawings as follows.

Figure 1:
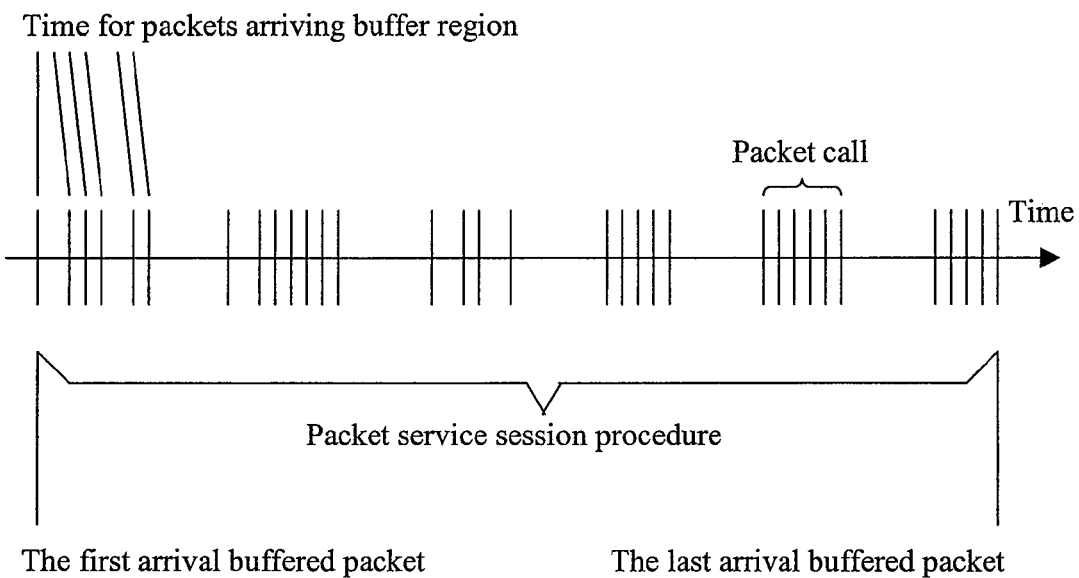
FIG. 1 is a service model illustration diagram of a WWW browsing service.
Figure 2:
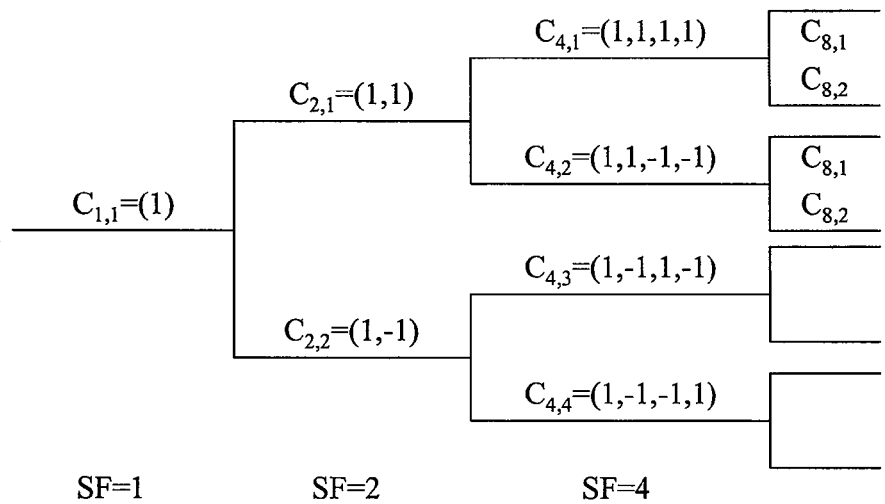
FIG. 2 is an illustration diagram of a code tree of an orthogonal variable spread factor (OVSF).
Figure 3:
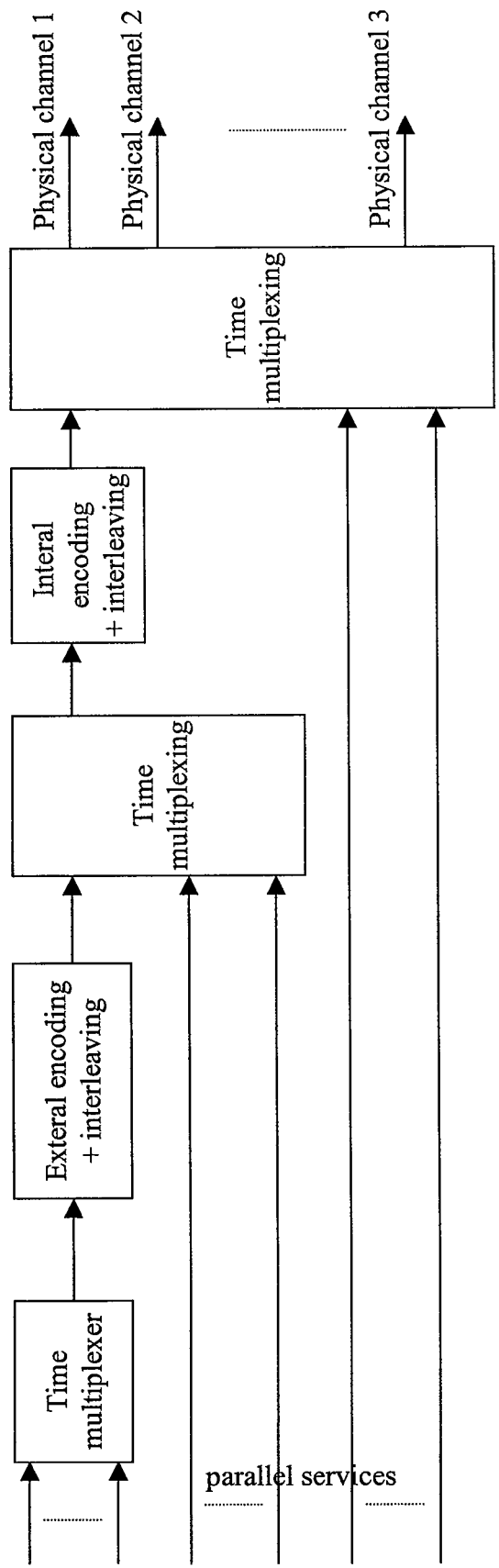
FIG. 3 is an illustration diagram of common CDMA service multiplex.
Figure 4:
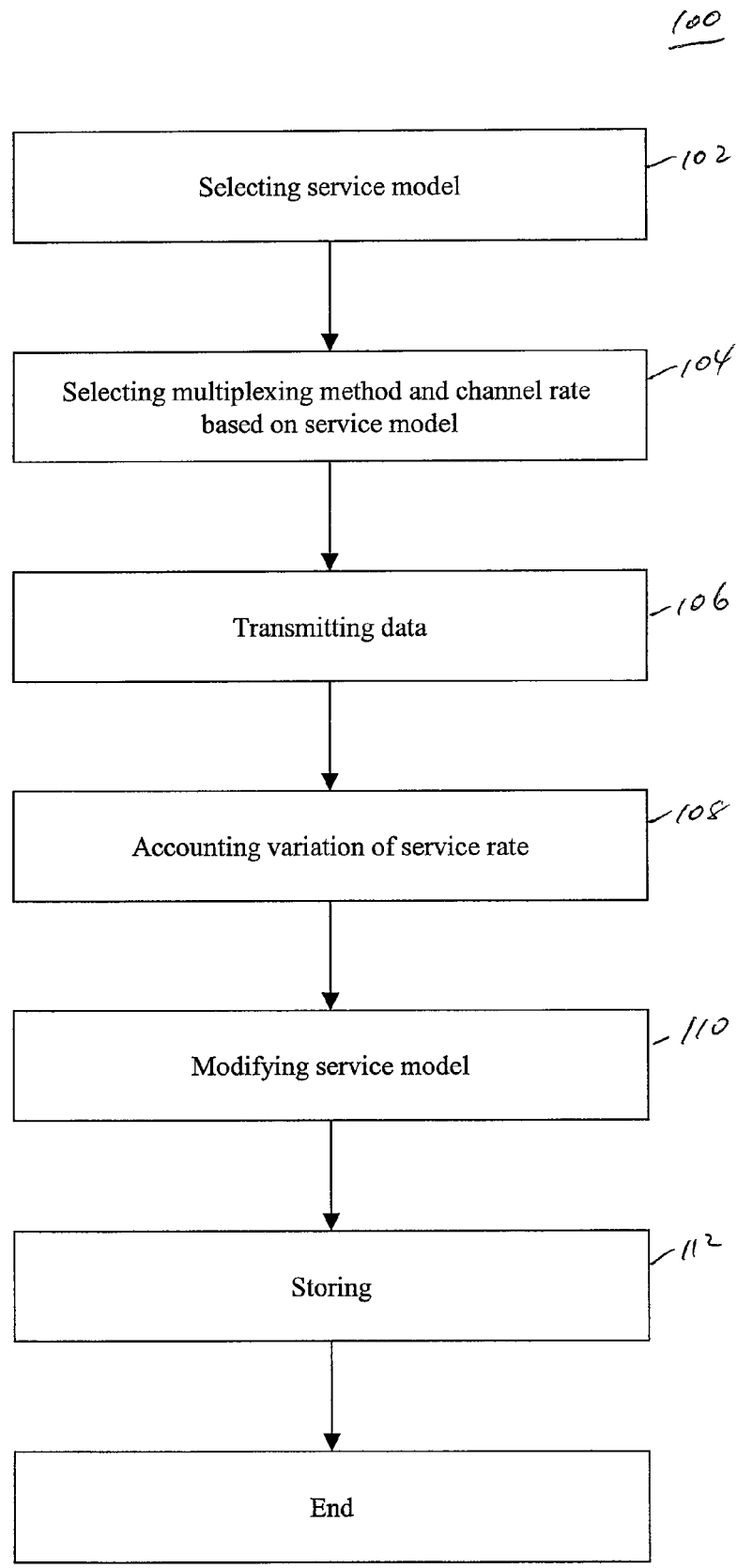
FIG. 4 is a flow chart of one embodiment of a method for enhancing channel utilization in a CDMA system in accordance with the principles of the present invention.
Figure 5:
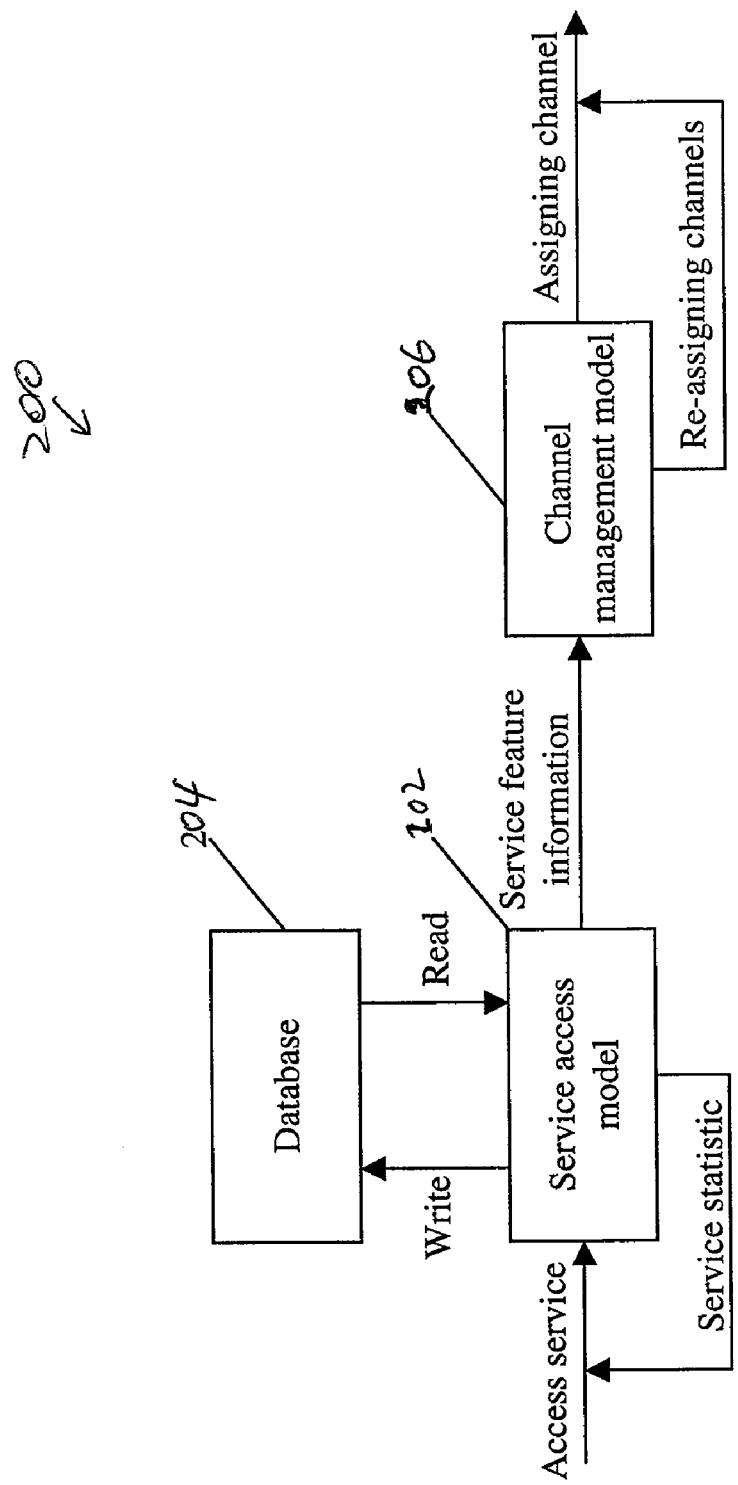
FIG. 5 is a block diagram of one embodiment of an apparatus for enhancing channel utilization in a CDMA system in accordance with the principles of the present invention.

FIG. 4 and FIG. 5 illustrate a method 100 and an apparatus 200 for enhancing channel utilization of a CDMA system, respectively. The method 100 starts with a step 102 selecting a service model. When a service request of a certain user is received by the service access module 202 of the CDMA system, service type information and user information of the service are included in the service request. A service feature of the current service of the user is retrieved from a system database 204 based on the user information and the service type information of the service, wherein each service of each user has an individual service feature. Alternatively, the services of the same type of each user has an individual service feature. An initial service feature of each service of each user is determined based on a common model of the service types, and a general feature of the service types is reflected by the initial service feature of the initial service type. The service types may include packet services, voice services, and the other non-constant rate services. The service features may include a maximum rate of the service, a duration of the maximum rate of the service, occurrence probability of the maximum rate, an average rate of the service, a duration of the average rate of the service, occurrence probability of the average rate, a minimum rate of the service, a duration of the minimum rate of the service, and occurrence probability of the minimum rate. The service features may include distribution of the rate of the services, distribution of duration of each rate, and tendency statistic of rate variations. Further, the initial service feature of each service type of each user is determined based on a common model of the service type.

In the next step 104, the service feature is transmitted by the CDMA system to a channel management module 206, and a channel multiplexing method and a channel bandwidth are selected by the channel management module 206 based on the service feature.

In the following step 106, the data are transmitted. If the data transmission rate during the data transmission changes to an extent that the capacity of a currently configured channel cannot satisfy the requirement of the data transmission rate during the data transmission, the currently configured channel will be re-assigned by the channel management module 206.

In the next step 108, the variation of the data transmission rate is accounted continuously by the service access module 202, which is used as a foundation or reference for modifying the service feature.

In the following step 110, the service feature of the current service is modified based on statistic results. When the service feature is modified continuously, the service feature is adapted to be approximate to the original service feature. The modified service feature may be used in the next communication as a reference of the channel configuration.

In the next step 112, the resulted modified service feature is updated in the system database 204, so that when the next service request of the same type of the user is received, the modified service feature may be used as a reference for configuring the channel.

INDUSTRIAL APPLICABILITY

In an application of the present invention, a channel configuration is first considered from the aspect of the service feature of a service so as to enhance the efficiency of the channel configuration. During a subsequent service communication procedure, the service feature is further accounted, and the service feature is modified based on the statistic results to make the service feature to be approximate to the actual situation gradually. Accordingly, the number of times of re-configuring the channel is decreased, and the channel utilization is enhanced.

Assume that three service types are required to be performed by a user, wherein the maximum rate of each service is 32 Kbit/s, the occurrence probabilities of the maximum rate of the respective services are 0.1, 0.2, and 0.2, respectively. Three service types are multiplexed onto a channel having a rate of 32 Kbit/s according to the method of the present invention. Utilization of the channel is 0.5. The channel multiplexing can be performed continuously on the channel. Comparing to the conventional method where each service is assigned one 32 Kbit/s channel, respectively, the channel utilization of the present invention is increased by a factor of at least 3. Meanwhile, two code resources having the rate of 32 Kbit/s are saved and can be used by the other users, thereby increasing the system capacity. Also, for the same service, different users may have different characteristics, for example, in browsing a website page, different users may have different reading speed. Therefore, the service feature of each user may be different. In one application, when a plurality of WWW browsing windows are opened by a user, a WWW browsing common model is no longer suitable for the user. Thus, it is necessary to account and calculate the service models for each of the users. By analyzing a service feature of a specific service of a certain user, the information, such as the maximum rate, the duration of the maximum rate, the average rate, the minimum rate, etc., is used as a reference for configuring the channels. Accordingly, the blinded assignment of channels is avoided, and re-assigning signals as a result of the blinded assignment of channels is significantly reduced. Thus, the channel utilization is enhanced, and the efficiency of the CDMA system is significantly increased.

What is claimed is:

1. A method for enhancing channel utilization in a CDMA system, comprising the steps of:

receiving a service request for data transmission on a channel by a service access module of the CDMA system, the service request including information of a service type and a user, and a service feature of a current service of the user being retrieved from a system database based on the information of the service type and the user;

transmitting the service feature by the CDMA system to a channel management module of the CDMA system, and a channel multiplexing method and a channel bandwidth being selected by the channel management module based on the service feature;

transmitting data, wherein during the data transmission, when a data transmission rate changes to an extent that capacity of a currently configured channel cannot satisfy a requirement of the data transmission rate, the currently configured channel is re-assigned by the channel management module;

accounting a variation of the data transmission rate by the service access module during the data transmission;

modifying the service feature of the current service; and updating a corresponding record of the service feature in the system database, so that when a next service request of a same service type of the user is received, updated record of the service feature is used as a reference for configuring and assigning the channel.

2. The method of claim 1, wherein the service type comprises a packet service, a voice service, and a non-constant rate service.

3. The method of claim 1, wherein the service feature comprises a maximum rate, a duration of the maximum rate, occurrence probability of the maximum rate, an average rate, a duration of the average rate, occurrence probability of the average rate, a minimum rate, a duration of the minimum rate, and occurrence probability of the minimum rate.

4. The method of claim 1, wherein the service feature comprises distribution of data transmission rates, distribution of a duration of each of the data transmission rates, and tendency statistics of a variation of the data transmission rates.

5. The method of claim 1, wherein an initial service feature of each service type of each user is determined based on a common model of the service type.

6. The method of claim 1, wherein the step of modifying the service feature of the current service is implemented based on either a previously modified service feature or an initial service feature.

7. An apparatus for enhancing channel utilization in a CDMA system, comprising:

a service access module for receiving a service request for data transmission on a channel, the service request including information of a service type and a user;

a system database, a service feature of a current service of the user being retrieved from the system database based on the information of the service type and the user;

a channel management module, the service feature being transmitted to the channel management module, and a channel multiplexing method and a channel bandwidth being selected by the channel management module based on the service feature, and when a data transmission rate changes to an extent that capacity of a currently configured channel cannot satisfy a requirement of a data transmission rate, the currently configured channel is re-assigned by the channel management module; and wherein the service access module accounts a variation of the data transmission rate during the data transmission, modifies the service feature of the current service, and updates a corresponding record of the service feature in the system database, and when a next service request of a same service type of the user is received, updated record of the service feature is used as a reference for configuring and assigning the channel.

8. The apparatus of claim 7, wherein the service type comprises a packet service, a voice service, and a non-constant rate service.

9. The apparatus of claim 7, wherein the service feature comprises a maximum rate, a duration of the maximum rate, occurrence probability of the maximum rate, an average rate, a duration of the average rate, occurrence probability of the average rate, a minimum rate, a duration of the minimum rate, and occurrence probability of the minimum rate.

10. The apparatus of claim 7, wherein the service feature comprises distribution of data transmission rates, distribution of a duration of each of the data transmission rates, and tendency statistics of a variation of the data transmission rates.

11. The apparatus of claim 7, wherein an initial service feature of each service type of each user is determined based on a common model of the service type.

12. The apparatus of claim 7, wherein modification of the service feature of the current service is implemented based on either a previously modified service feature or an initial service feature.

* * * * *